UNITED STATES PATENT OFFICE.

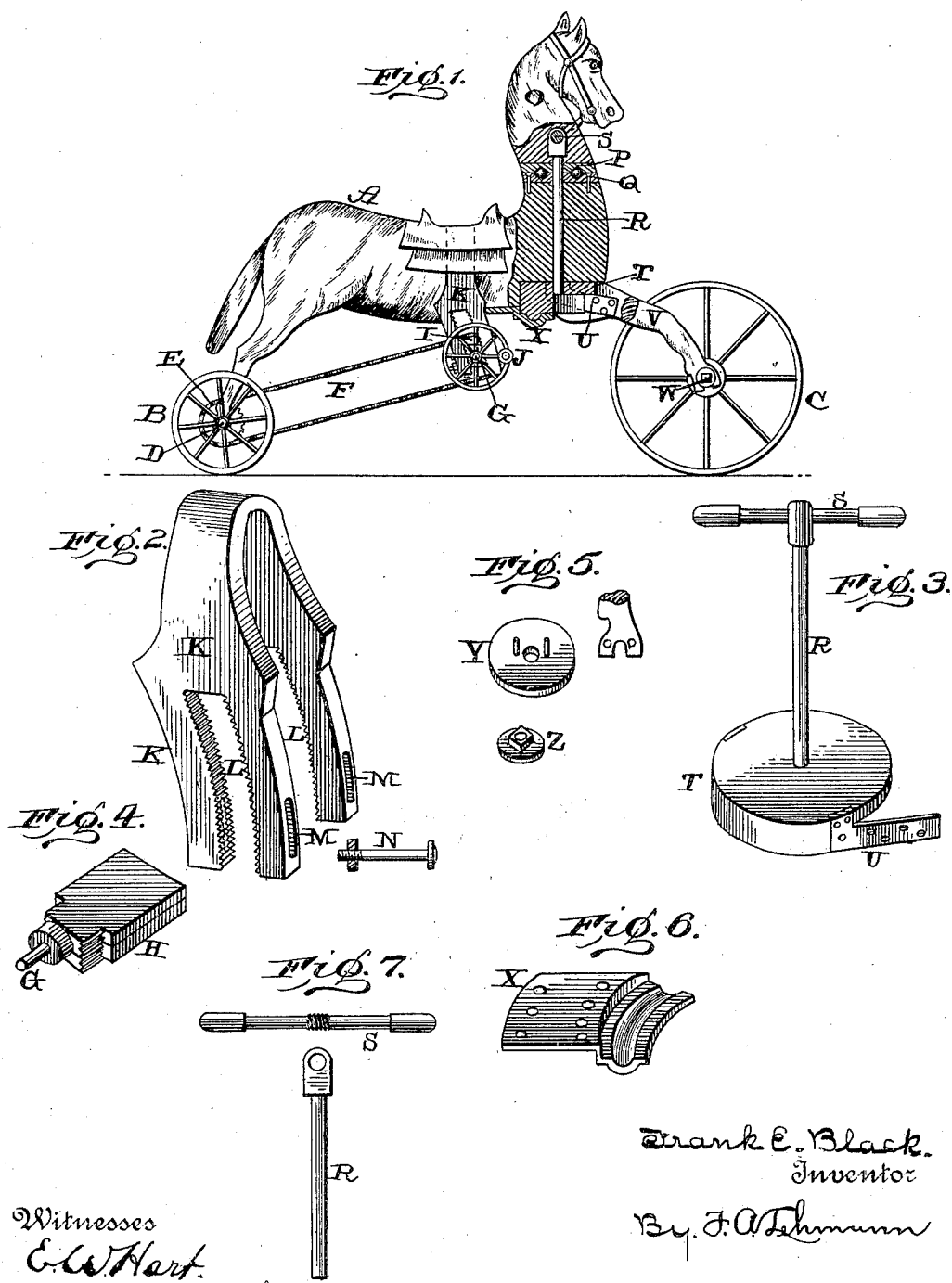

FRANK E. BLACK, OF BELLEMONT, ARIZONA TERRITORY.

COMBINED HOBBY-HORSE AND TRICYCLE.

SPECIFICATION forming part of Letters Patent No. 672,438, dated April 23, 1901.

Application filed June 13, 1900. Serial No. 20,159. (No model.)

*To all whom it may concern:*

Be it known that I, FRANK E. BLACK, a citizen of the United States, residing at Bellemont, in the county of Coconino and Territory of Arizona, have invented certain new and useful Improvements in a Combined Hobby-Horse and Tricycle; and I do hereby declare the following to be a full, clear, and exact description of the invention, such as will enable others skilled in the art to which it appertains to make and use the same.

My invention relates to an improvement in a combined hobby-horse and tricycle, and has for its object a hobby-horse mounted upon wheels and which can be propelled and guided by the child riding thereon and in which the parts are made vertically adjustable, so as to be adapted to children of different sizes.

My invention consists, first, in a combined hobby-horse and tricycle provided with vertically-adjustable cranks, whereby it can be adapted to children of different sizes; second, in a combined hobby-horse and tricycle, a movable head mounted upon the figure of the animal, combined with a steering-rod connected to the head, and means for connecting the rod with the front steering-wheel; third, in a combined hobby-horse and tricycle, suitable slotted hangers, and a suitable bearing in which the driving-shaft is journaled, combined with means for holding the bearing in position, and, fourth, in the arrangement and combination of devices, which will be more fully described hereinafter.

In the accompanying drawings, which represent my invention, Figure 1 is a side elevation of the hobby-horse and tricycle, parts being broken away, so as to show the internal construction. Fig. 2 is a detached perspective view of the hangers in which the journal-bearing is secured. Fig. 3 is a perspective of the steering-rod and the part connected to its lower end. Fig. 4 is a perspective of the journal for the driving-shaft. Fig. 5 is a detached view showing the manner of attaching the front hoofs to the steering-wheel. Fig. 6 is a perspective of the bearing-plate attached to the front end of the animal. Fig. 7 is a detached view showing the two parts of the guiding-rod.

A represents the figure of the horse or other animal, and which is mounted upon the small rear driving-wheels B and the large guiding-wheel C. Upon the rear axle D is secured a sprocket-wheel E, around which passes the driving sprocket-chain F from the driving-shaft G, journaled in the bearing H. This shaft G is also provided with a sprocket-wheel I, around which the chain F passes, and which shaft is provided with a driving-crank J at each end in the usual manner. Secured to the animal, under the saddle, are the slotted hangers K, which may be made in one, two, or more parts and of wood or metal, but preferably of metal, as being less liable to be broken. As shown in Fig. 2, these hangers are provided with curved slots L, so that the driving-shaft can be adjusted vertically to suit children of different sizes without in any way affecting the chain F, which passes around the sprocket-wheel on the rear axle, as shown. The slots are open at their lower ends, and the edges of the slots are corrugated or toothed, and each part or fork of each hanger is made hollow, and through the outer edges are formed the vertical slots M, through which the bolts N can be passed for the purpose of supporting the journal boxes or bearings H in any position into which they may be adjusted. The lower half of the journal-box H has teeth or projections for engagement with the teeth or projections upon the hangers and by means of which the bearing may be adjusted vertically, so as to raise or lower the driving-pedals, according to the size of the child riding. The box has lower projecting sides which fill the slots of the hangers, thus preventing any side movement of the box. The upper half of the box is connected to the lower half by threaded engagement and also has a screw and dust cap over the end of the box, which end extends beyond the sides of the hanger and is made round for threaded engagement with the cap. Ball-bearings may be used in connection with the box, if so desired.

The head O of the animal is not made stationary in the usual manner; but it is made of a separate part and is adapted to turn laterally in either direction, so as to guide the tricycle as it is being propelled about. Upon the lower end of the head is placed a suitable plate P, and upon the end of the body is placed a corresponding plate Q, and these plates may be grooved and receive ball-bearings between them, if so desired. Extending down through the front portion of the animal A is the steering-rod R, which is provided with handles S, which project through openings on opposite sides of the neck and by means of which handles the tricycle is guided. The reins may be connected so that the tricycle may be guided by the reins alone, or the child may catch hold of the handles as a means of safety. This handle-bar S is made detachable from the rod R, as shown in Fig. 7, and for this purpose the bar is provided with a screw-thread, and the upper end of the rod is provided with a screw-threaded opening, through which the handle-bar passes. To the lower end of the steering-rod R is secured the flat disk T, to which are secured the angular braces U, and to these braces are secured the front legs V of the animal. When the steering-rod is turned, this disk T is also turned and with it the legs of the animal, in the lower ends of which legs the axle W of the steering-wheel C is journaled. In order to support the disk T in position, there is secured to the under side of the front portion of the animal the supporting-plate X, which has its front edge grooved, as shown in Fig. 6, and over which grooved portion the rear edge of the disk T catches, the disk being provided with a corresponding flange upon its under side to fit in the grooved portion of the plate X. This plate X serves not only to support the disk T, but to guide it in its movements.

The hoofs upon the front legs of the animal have open-ended slots which catch over the front axle W, and through these hoofs are made suitable openings, one on each side of the axle. The hoofs bear against disks Y, provided with pins or projections which pass through the hoofs, as shown in Fig. 5, and then a nut Z is secured to each end of the front axle, so as to rigidly secure the disks Y in position against opposite ends of the hub of the wheel C. The wheel C freely revolves, while the disks Y remain stationary upon the axle.

By means of the construction here shown a combined hobby-horse and tricycle is produced and one which can be propelled freely about and guided by even very shall children. The axle being vertically adjustable is adapted for children of different sizes, and especially those too small or timid to ride upon bicycles.

Having thus described my invention, I claim—

1. In a combined hobby-horse and tricycle, the figure of an animal for the rider to sit upon, a hanger adapted to straddle the back of the animal and provided with longitudinal open-ended slots, said slots having serrated faces, combined with a vertically-adjustable and removable bearing having serrated faces adapted to engage with the serrations in the hanger, a propelling mechanism connected to the rear driving-wheels, and a clamping-bolt upon which the hanger rests, substantially as described.

2. In a combined hobby-horse and tricycle, the figure of an animal for the rider to sit upon, and a U-shaped hanger adapted to straddle the back of the animal, the depending arms of which have longitudinal curved slots provided with serrated faces, a vertically-adjustable and removable bearing having serrated sides to coact with the serrations in the hanger-slots and whereby the bearing is held in the hanger.

3. In a combined hobby-horse and tricycle, the figure of an animal for the rider to sit upon, a U-shaped hanger adapted to straddle the back of the animal and provided with longitudinally-curved slots, and a removable bearing vertically adjustable in the slots of the hanger and carrying propelling mechanism, combined with a head pivoted upon the body, a steering-rod, the handle-bar which passes through both the steering-rod and the head of the animal, a disk secured to the lower end of the rod, the supporting-plate having a grooved bearing with the disk, the front legs, the braces connecting the disk with the front legs of the animal, the front wheels and axle, and a plate having pins for securing the front legs to the axle, substantially as described.

4. A combined hobby-horse and tricycle, the body of the animal mounted upon suitable wheels, the head pivoted upon the body, the steering-rod, the handle-bar which passes through both the steering-rod and the head of the animal, the disk secured to the lower end of the steering-rod, and the braces U secured to the disk, combined with the front legs of the animal secured to the disk by means of the braces, the front axle, the steering-wheel placed thereon, the disks placed upon the front axle, and provided with pins or projections which pass through the front hoofs, and the nuts secured to the front axle, substantially as specified.

In testimony whereof I affix my signature in presence of two witnesses.

FRANK E. BLACK.

Witnesses:
T. E. PULLIAM,
GEO. E. SULLIVAN.